US012706111B2

(12) United States Patent
Plude et al.

(10) Patent No.: US 12,706,111 B2
(45) Date of Patent: Aug. 11, 2026

(54) RECEIVE-SIDE AUDIO PROCESSING FOR CALLS IN A WEB CONFERENCING CLIENT

(71) Applicant: Cisco Technology, Inc., San Jose, CA (US)

(72) Inventors: Scott Plude, San Jose, CA (US); Mathew Shaji Kavalekalam, Warsaw (PL); Nathan Allan Rickey, San Marcos, CA (US); Kamil Krzysztof Wojcicki, Kangaroo Point (AU); Mansur Yesilbursa, Krakow (AR); Rafal Pilarczyk, Plock (PL)

(73) Assignee: Cisco Technology, Inc., San Jose, CA (US)

( * ) Notice: Subject to any disclaimer, the term of this patent is extended or adjusted under 35 U.S.C. 154(b) by 209 days.

(21) Appl. No.: 18/425,122

(22) Filed: Jan. 29, 2024

(65) Prior Publication Data

US 2025/0131936 A1 Apr. 24, 2025

Related U.S. Application Data

(60) Provisional application No. 63/545,515, filed on Oct. 24, 2023.

(51) Int. Cl.
*G10L 21/0232* (2013.01)
*G10L 15/06* (2013.01)
(Continued)

(52) U.S. Cl.
CPC ........ *G10L 21/0232* (2013.01); *G10L 15/063* (2013.01); *G10L 25/18* (2013.01);
(Continued)

(58) Field of Classification Search
CPC ... G10L 21/0232; G10L 15/063; G10L 25/18; G10L 25/21; G10L 25/51; H04M 3/18
See application file for complete search history.

(56) References Cited

U.S. PATENT DOCUMENTS 6,680,972 B1 * 1/2004 Liljeryd ................ G10L 21/038 375/240
7,085,263 B1 * 8/2006 Fitzgerald ........... H04M 3/4285 379/393

(Continued)

OTHER PUBLICATIONS

Prasad et al., (Bandwidth extension of speech signals: A comprehensive review, International Journal of Intelligent Systems and Applications, 2016 (Year: 2016).*

*Primary Examiner* — Bhavesh M Mehta
*Assistant Examiner* — Eunice Lee
(74) *Attorney, Agent, or Firm* — Lee & Hayes, P.C.

(57) ABSTRACT

According to one or more embodiments of the disclosure, receive-side audio processing for calls in a web conferencing client is provided by a method that includes receiving, by a device, an audio signal from a sending device and detecting, by the device, a particular telephony audio cue present in the audio signal, wherein the particular telephony audio cue has similar characteristics of noise that is to be removed by a noise removal operation. The method further includes preserving, by the device, the particular telephony audio cue in the audio signal throughout the noise removal operation on the audio signal and causing, by the device, an enhanced audio signal to be produced in conjunction with the noise removal operation, wherein the enhanced audio signal includes the particular telephony audio cue to be delivered to a receiver device.

20 Claims, 14 Drawing Sheets

(51) Int. Cl.

| | |
|---|---|
| ***G10L 25/18*** | (2013.01) |
| ***G10L 25/21*** | (2013.01) |
| ***G10L 25/51*** | (2013.01) |
| ***H04M 3/18*** | (2006.01) |

(52) U.S. Cl.
CPC .............. *G10L 25/21* (2013.01); *G10L 25/51* (2013.01); *H04M 3/18* (2013.01)

(56) References Cited

U.S. PATENT DOCUMENTS

| | | | | |
|---|---|---|---|---|
| 8,488,805 | B1 * | 7/2013 | Santos | H04M 9/08 381/77 |
| 2013/0124198 | A1 | 5/2013 | Jeong et al. | |
| 2019/0387313 | A1 * | 12/2019 | Bharitkar | H04N 21/4302 |
| 2021/0289296 | A1 | 9/2021 | Stamenovic et al. | |
| 2022/0148611 | A1 | 5/2022 | Slapak et al. | |
| 2022/0238087 | A1 | 7/2022 | Steffensen et al. | |
| 2022/0369031 | A1 * | 11/2022 | Lester | G10L 21/028 |
| 2023/0326476 | A1 | 10/2023 | Andreev et al. | |
| 2023/0421701 | A1 * | 12/2023 | Griffin | H04M 3/568 |
| 2024/0022565 | A1 * | 1/2024 | Keith, Jr. | H04L 63/0861 |

* cited by examiner

1300

MACRO ANALYSIS OF SNR

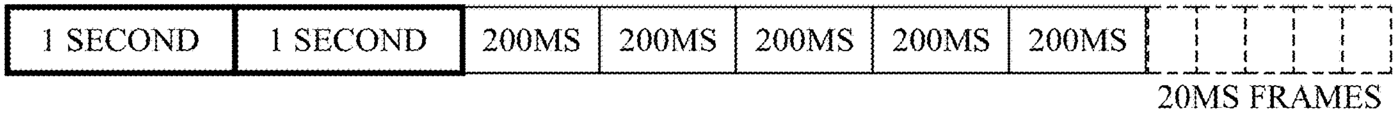

- Measure SNR metrics for 20 ms frame. (BWE statistics low-passed at 4kHz)
  - Signal power – input to BNR
  - Signal hp power – input high-passed at 4.5 kHz
  - Output power – output of BNR
  - Noise power – signal removed by BNR
  - SNR – (signal power / noise power)
- 200 msec period analysis
  - State – BNR in transition, Beep Detection, Music Detection
  - SNR metrics – (Maximum, Average, and Minimum Values)
  - *spchFrameCount* - Number of frames SNR is greater than 0dB (PSTN Detection)
  - *hfFrameCount* - Number of frames Signal hp power is greater than -64 dB (PSTN Detection)
- 3.2 seconds of history collected.
  - Music Detection has ~3 seconds of latency so need to backtrack detections.

FIG. 13

RECEIVE-SIDE AUDIO PROCESSING FOR CALLS IN A WEB CONFERENCING CLIENT

RELATED APPLICATION

This application claims priority to U.S. Prov. Appl. No. 63/545,515, filed Oct. 24, 2023, entitled RECEIVE-SIDE AUDIO PROCESSING FOR CALLS IN A WEB CONFERENCING CLIENT, by Plude, et al., the contents of which are incorporated herein by reference.

TECHNICAL FIELD

The present disclosure relates generally to computer networks, and, more particularly, to receive-side audio processing for calls in a web conferencing client.

BACKGROUND

Web conferencing technologies, such as WebEx from Cisco Systems, Inc., currently remove noise from outgoing meetings and calls. When making or receiving a call through such web conferencing applications, however, the far terminal may be providing little or no noise removal.

Furthermore, the audio may be bandwidth limited, providing no content in frequencies above 8 kHz. Specifically, public-switched-telephone-networks (PSTN) have a narrow bandwidth of usually 300 Hz to 3000 Hz.

Therefore, it is desirable to enable speech enhancement on the receiving side and to add a bandwidth extension feature for when the far side is a PSTN stream. However, telephony features such as tones and music-on-hold (MOH) might appear as noise to the speech enhancement software, and might be suppressed. For example, customers will get confused if they hear "Please leave your name and number after the beep", but do not hear any beep. What is needed, then, is a system that removes noise while preserving music-on-hold and beeps/tones, allowing the customer to clearly hear someone calling from a noisy environment, without confusing them by removing needed beeps, tones, or music.

BRIEF DESCRIPTION OF THE DRA WINGS

The embodiments herein may be better understood by referring to the following description in conjunction with the accompanying drawings in which like reference numerals indicate identically or functionally similar elements, of which:

FIG. 13 illustrates an example of macro analysis of a signal-to-noise ratio (SNR) in accordance with one or more implementations described herein.

DESCRIPTION OF EXAMPLE EMBODIMENTS

Overview

According to one or more embodiments of the disclosure, a method for receive-side audio processing for calls in a web conferencing client includes receiving, by a device, an audio signal from a sending device and detecting, by the device, a particular telephony audio cue present in the audio signal, wherein the particular telephony audio cue has similar characteristics of noise that is to be removed by a noise removal operation. The method further includes preserving, by the device, the particular telephony audio cue in the audio signal throughout the noise removal operation on the audio signal and causing, by the device, an enhanced audio signal to be produced in conjunction with the noise removal operation, wherein the enhanced audio signal includes the particular telephony audio cue to be delivered to a receiver device.

Other embodiments are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
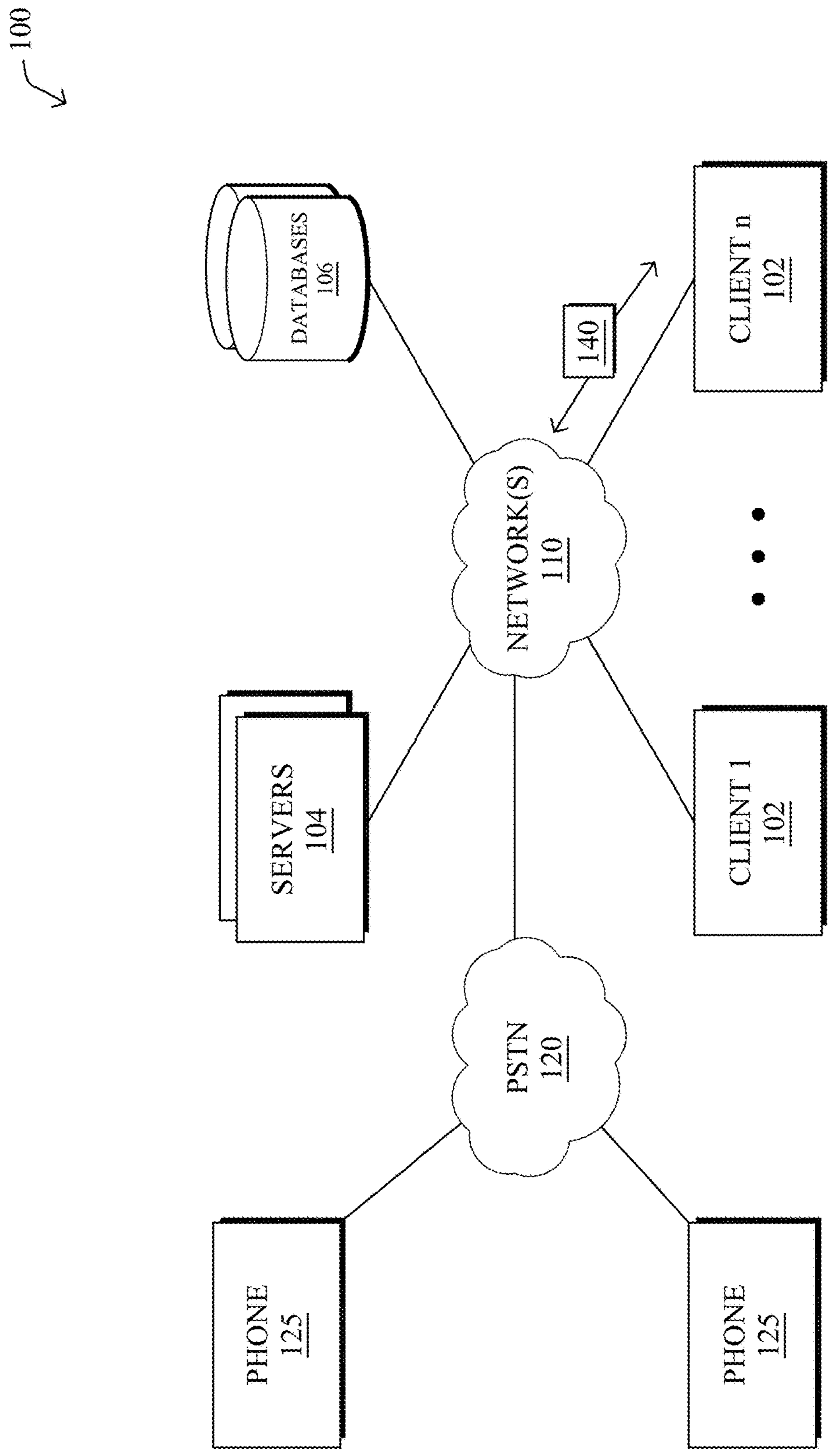
FIG. 1 illustrates an example communication network.

FIG. 1 is a schematic block diagram of an example computing system 100 illustratively comprising client devices (e.g., client devices 102, which may include a first through nth client device), servers 104 (e.g., one or more servers), and databases 106 (e.g., one or more databases), where the devices may be in communication with one another via one or more networks (e.g., network(s) 110). The network(s) 110 may include, as would be appreciated, any number of specialized networking devices such as routers, switches, access points, etc., interconnected via wired and/or wireless connections. For example, client devices 102, servers 104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, collaboration endpoints, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

In addition, a separate public switched telephone network (PSTN 120) may also be considered to be a part of computing system 100, namely where phones 125 connect to the PSTN 120 in a standard manner (e.g., landlines, cellphones, and so on). The PSTN may be based on any number of carrier telephone networks which provide a connection to network(s) 110 for things such as conference calls, video calls, calls to voice over IP (VOIP) end points, and so on, as will be readily understood by those skilled in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
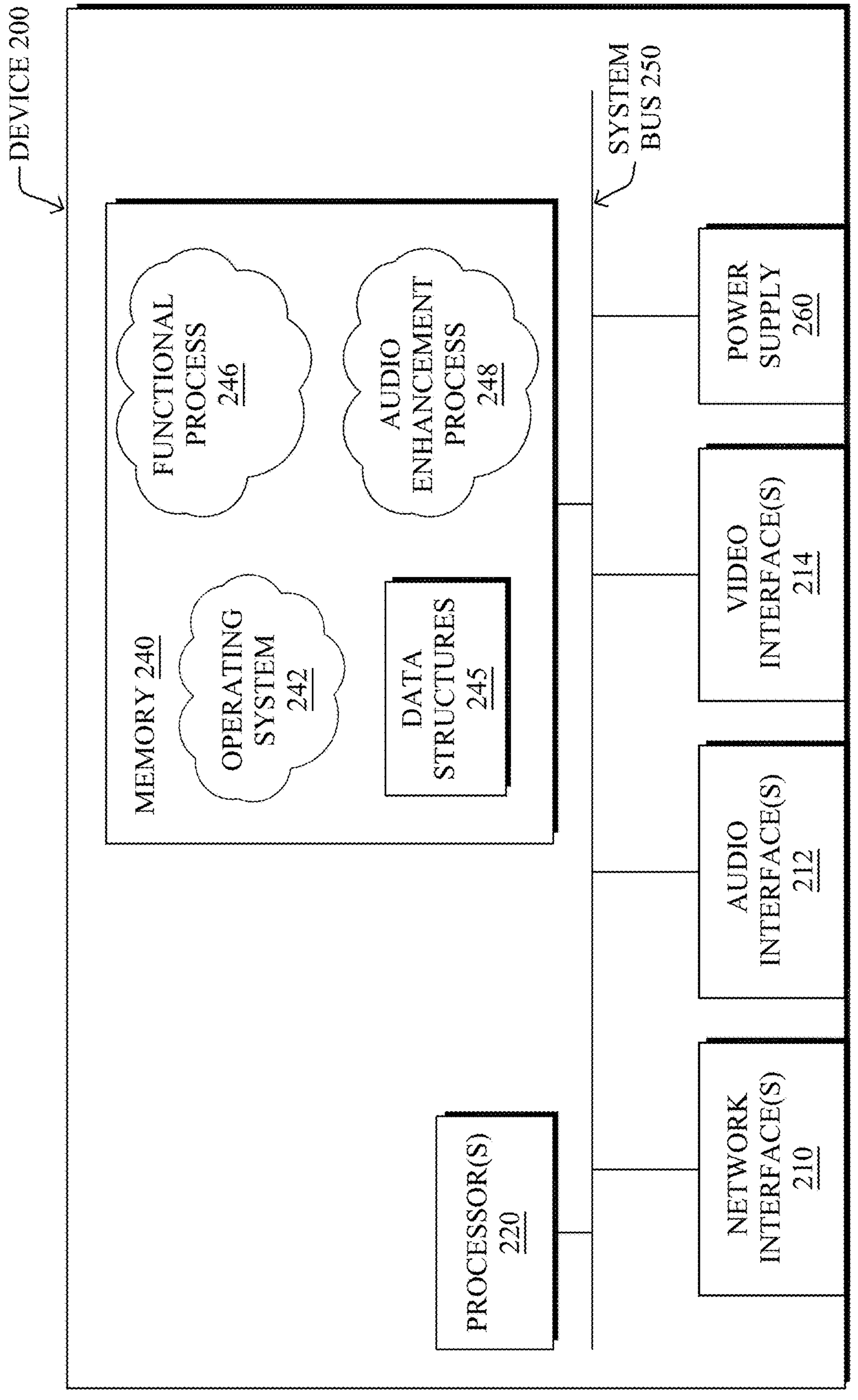
FIG. 2 illustrates an example network device/node.

FIG. 2 is a schematic block diagram of an example node such as device 200 (e.g., an apparatus) that may be used with one or more embodiments described herein, e.g., as any of the client devices 102, servers 104, databases 106 shown in FIG. 1 above. Device 200 may also be any other suitable type of device depending upon the type of network architecture in place, such as a collaboration endpoint, "receiver" (herein), etc. Device 200 may comprise one or more network interfaces (e.g., interfaces 210), one or more audio interfaces (e.g., audio interfaces 212), one or more video interfaces (e.g., video interfaces 214), one or more processors (e.g., processor(s) 220), and a memory 240 interconnected by a system bus 250, and is powered by a power supply 260.

The network interfaces (e.g., interfaces 210) include the mechanical, electrical, and signaling circuitry for communicating data over physical links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

The audio interfaces 212 may include the mechanical, electrical, and signaling circuitry for transmitting and/or receiving audio signals to and from the physical area in which a device 200 is located. For instance, audio interfaces 212 may include one or more speakers and associated circuitry to generate and transmit soundwaves. Similarly, audio interfaces 212 may include one or more microphones and associated circuitry to capture and process soundwaves.

The video interfaces 214 may include the mechanical, electrical, and signaling circuitry for displaying and/or capturing video signals. For instance, video interfaces 214 may include one or more display screens. At least one of the display screens may comprise a touch screen, such as a resistive touchscreen, a capacitive touchscreen, an optical touchscreen, or other form of touchscreen display, to allow a user to interact with device 200. In addition, video interfaces 214 may include one or more cameras, allowing device 200 to capture video of a user for transmission to a remote device via interfaces 210. Such cameras may be mechanically controlled, in some instances, to allow for repositioning of the camera, automatically.

The memory 240 comprises a plurality of storage locations that are addressable by the processor(s) 220 and the interfaces 210 (e.g., network interfaces) for storing software programs and data structures associated with the embodiments described herein. The processor(s) 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an audio enhancement process 248, as described herein. Notably, one or more functional processes 246, when executed by processor(s) 220, cause each particular device (e.g., device 200) to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

For web-based conferencing services, such as a videoconference, teleconference, one-on-one (e.g., VoIP) calls, and so on, the one or more functional processes 246 may be configured to allow device 200 to participate in a virtual meeting/conference during which, for example, audio data captured by audio interfaces 212 and optionally video data captured by video interfaces 214 is exchanged with other participating devices of the virtual meeting (or a videoconference) via interfaces 210. In addition, conferencing processes may provide audio data and/or video data captured by other participating devices to a user via audio interfaces 212 and/or video interfaces 214, respectively. As would be appreciated, such an exchange of audio and/or video data may be facilitated by a web conferencing service (e.g., Webex by Cisco Systems, Inc., etc.) that may be hosted in a data center, the cloud, or the like.

Figure 3:
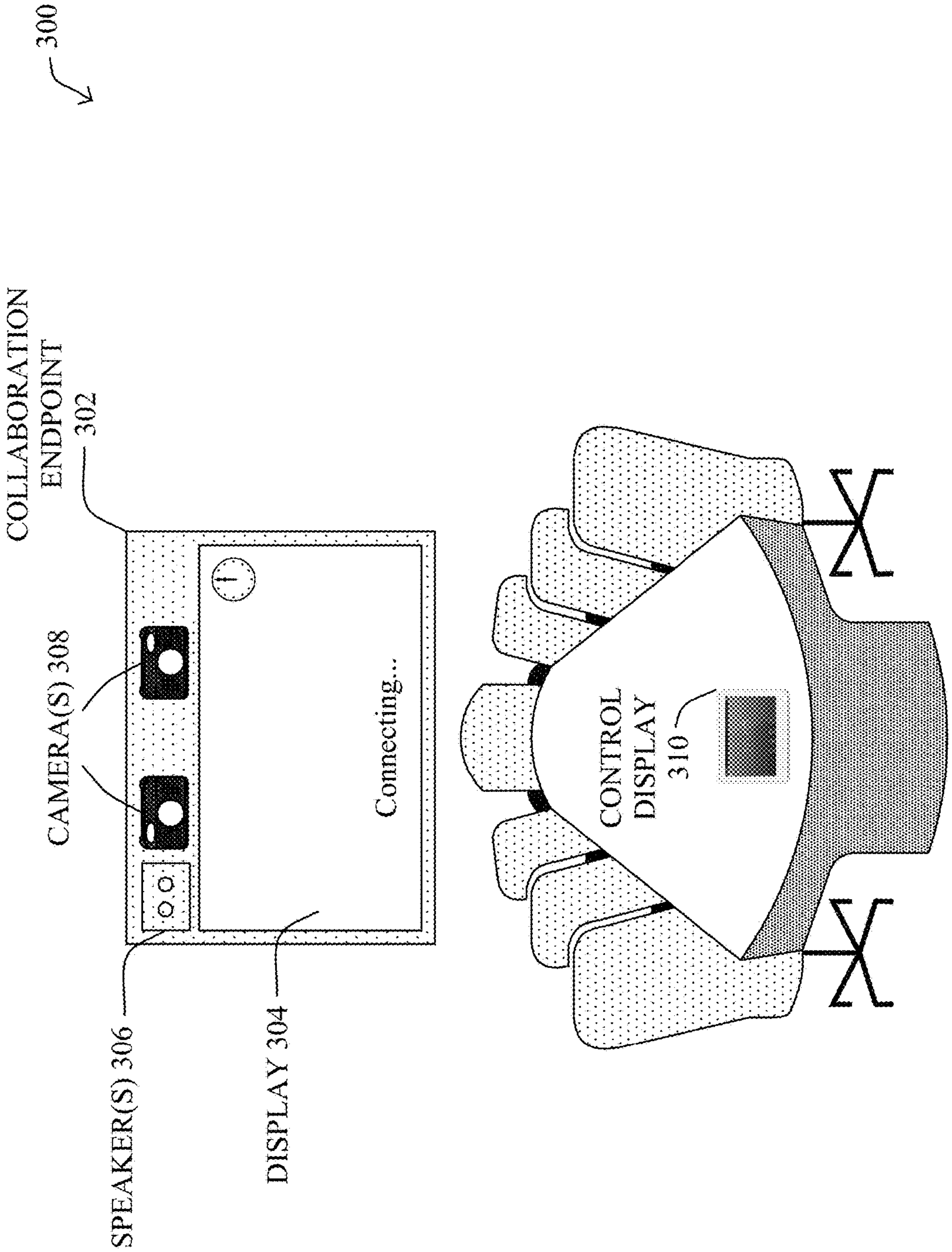
FIG. 3 illustrates various example components of an illustrative videoconferencing system.

For instance, FIG. 3 illustrates an example meeting room 300 in which a collaboration endpoint 302 is located, according to various embodiments. During operation, collaboration endpoint 302 may capture video via its one or more cameras 308, audio via one or more microphones, and provide the captured audio and video to any number of remote locations (e.g., other collaboration endpoints) via a network. Such videoconferencing may be achieved via a videoconferencing/management service located in a particular data center or the cloud, which serves to broker connectivity between collaboration endpoint 302 and the other endpoints for a given meeting. For instance, the service may mix audio captured from different endpoints, video captured from different endpoints, etc., into a finalized set of audio and video data for presentation to the participants of a virtual meeting (or a videoconference). Accordingly, collaboration endpoint 302 may also include a display 304 and/or speakers 306, to present such data to any virtual meeting (or a videoconference) participants located in meeting room 300.

Also as shown, a control display 310 may also be installed in meeting room 300 that allows a user to provide control commands for collaboration endpoint 302. For instance, control display 310 may be a touch screen display that allows a user to start a virtual meeting, make configuration changes for the videoconference or collaboration endpoint 302 (e.g., enabling or disabling a mute option, adjusting the volume, etc.).

In some cases, any of the functionalities of collaboration endpoint 302, such as capturing audio and video for a virtual meeting (or a videoconference), communicating with a videoconferencing service, presenting videoconference data to a virtual meeting participant, etc., may be performed by other devices, as well. For instance, a personal device such as a laptop computer, desktop computer, mobile phone, tablet, or the like, may be configured to function as an endpoint for a videoconference (e.g., through execution of a videoconferencing client application), in a manner similar to that of collaboration endpoint 302.

Figure 4:
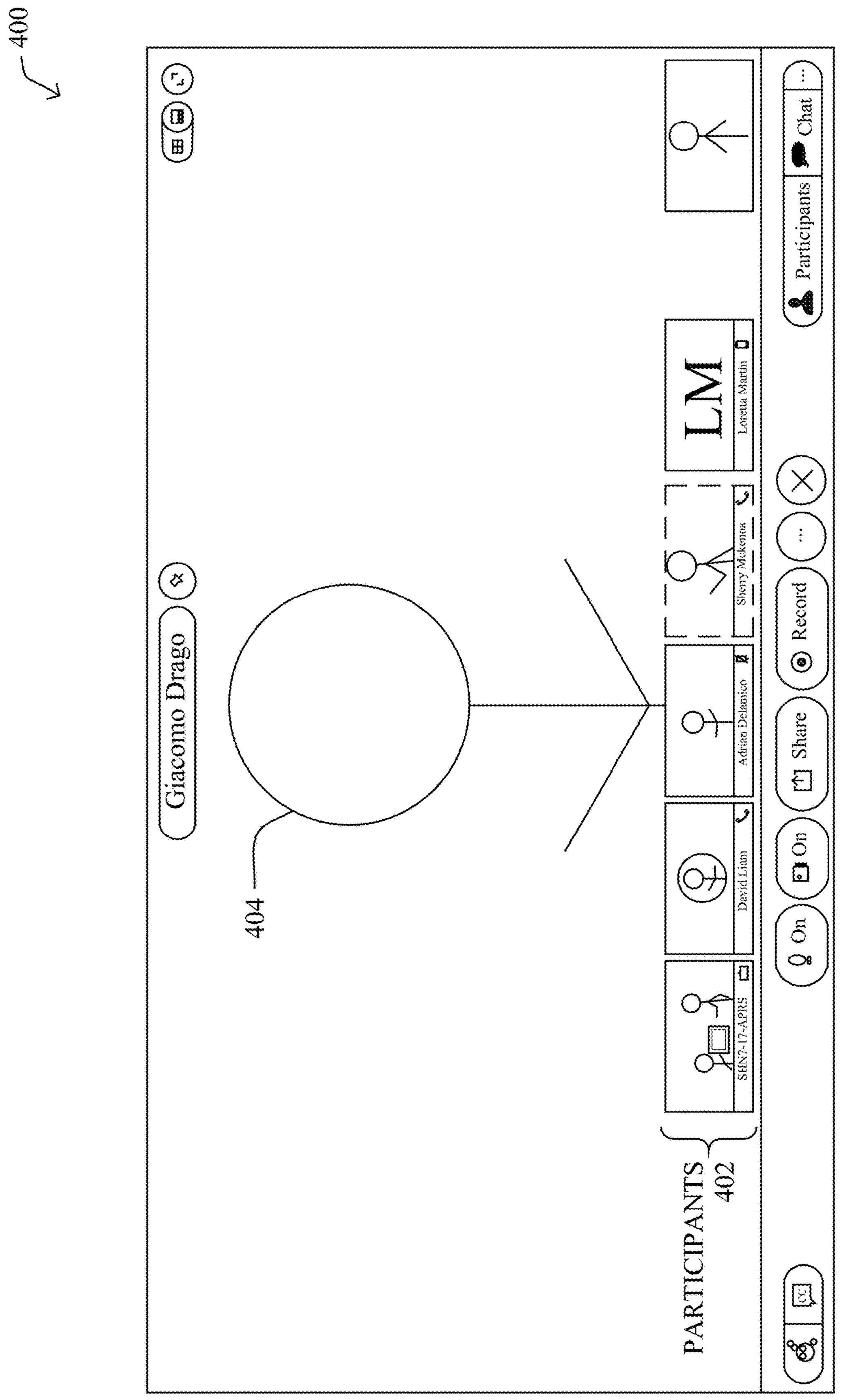
FIG. 4 illustrates an example display of a virtual meeting (or a videoconference)

In addition, FIG. 4 illustrates an example display 400 of a virtual meeting (or a videoconference), according to various embodiments. As shown, video for participants 402 may be presented in conjunction with that of a presenter 404. For instance, video data for each of participants 402 (e.g., video captured by each of their respective cameras) may be presented along the bottom of the displayed conference, along a side of the displayed conference, or the like. Typically, the host or presenter of the videoconference, may be displayed in a prominent location on screen, with their video appearing much larger than that of participants 402. This may be considered a stage or presenter mode of the virtual meeting. However, other presentation modes are contemplated, for instance, where each participant shares an equal amount of the displayed conference, or where the current speaker is shown in the prominent view.

Other styles, configurations, and operations of web conferences, presentations, calls, and so on may be understood by those skilled in the art, and those shown and described above are merely examples that are not meant to be limiting to the scope of the present disclosure.

Receive-Side Audio Processing for Calls in a Web Conferencing Client

As noted above, web conferencing technologies, such as WebEx from Cisco Systems, Inc., currently remove noise from outgoing meetings and calls. Such audio enhancement techniques may be implemented by a central conference server (e.g., Webex servers), or else by client-based conference applications (e.g., a local Webex app) who wish to add receiver side audio enhancements.

Figure 5:
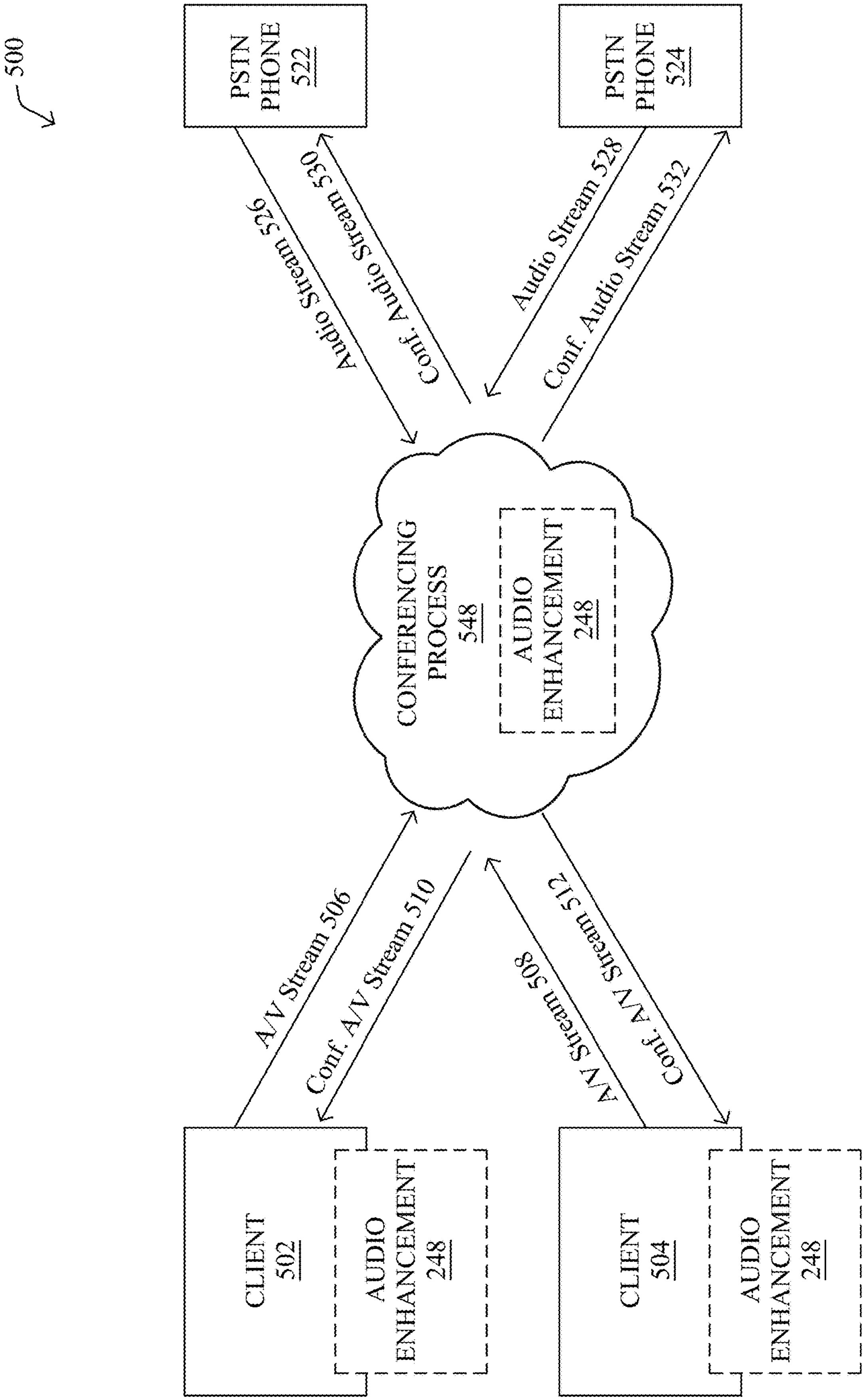
FIG. 5 illustrates an example architecture for a conference service with public switched telephone network (PSTN) callers.

FIG. 5 illustrates an example architecture 500 for a conference service with public switched telephone network (PSTN) callers, particularly with receiver side noise reduction and speech enhancement, according to various embodiments. At the core of architecture 500 is conferencing process 548, which may be executed by a device that provides a conferencing (web conference, call, virtual meeting, etc.) service in a network, or another device in communication therewith. Additionally, as shown, architecture 500 may include a first client 502 and a second client 504 that operate in conjunction with one another and a conferencing process 548 (e.g., a videoconferencing process). Moreover, one or more PSTN phones (e.g., PSTN phones 522 and 524) may also call in to the conference, as will be understood by those skilled in the art (e.g., the PSTN providers connect to an OPUS-based system to convert the signals into OPUS codec encoding, etc.).

For purposes of illustration, assume that first client 502, second client 504, PSTN phone 522, and PSTN phone 524 are operated by participants (e.g., end users) of the conference. Each of first client 502 and second client 504 may generate and send audio-video streams 506, 508 to conferencing process 548, where audio-video streams 506, 508 include video captured by a corresponding camera of the clients (e.g., a video of the participant) as well as audio captured by a corresponding microphone of the clients (e.g., a sound recording of the participant). PSTN phone 522 and PSTN phone 524, on the other hand, send audio codec streams 526 and 528 to conferencing process (e.g., via a PSTN provider, as mentioned above).

Subsequent to receiving audio-video streams 506, 508, as well as the audio codec streams 526, 528, the conferencing process 548 may be configured to generate and send conference A/V streams 510, 512 to, respectively, first client 502 and second client 504, where conference A/V streams 510, 512 may be used by the clients to display a virtual meeting (or a conference), for example, as described with respect to FIG. 4. Also, the conferencing process 548 may be configured to generate and send conference audio streams 530, 532 to, respectively, PSTN phone 522 and PSTN phone 524, where conference audio streams 530, 532 may be used by the phones to allow a user to listen to virtual meeting (or a conference), accordingly.

As described herein, audio enhancement process 248 may, after receiving PSTN-based audio codec streams (e.g., audio codec streams 526, 528, etc.), may modify/enhance the received audio (at the receiver side of the audio) such that the recipient's audio (whether of conference A/V streams 510, 512 for a first client 502, second client 504, or an audio stream returned to another PSTN phone 522 or PSTN phone 524) includes the enhanced audio. As mentioned herein, the audio enhancement process 248 may be on the conferencing process 548 (e.g., on a conference server), or may be on an end client, such as first client 502 or second client 504, depending upon configuration, implementation, and so on.

As also noted above, when making or receiving a call through web conferencing applications, however, the far terminal may be providing little or no noise removal. Furthermore, the audio may be bandwidth limited, providing no content in frequencies above 8 kHz. Specifically, PSTNs have a narrow bandwidth of usually 300 Hz to 3000 Hz.

Moreover, while it is desirable to enable speech enhancement on the receiving side and to add a bandwidth extension feature for when the far side is a PSTN stream, telephony features such as tones and music-on-hold (MOH or M-O-H) might appear as noise to the speech enhancement software, and might be suppressed.

The techniques herein, therefore, provide for receive-side audio processing for calls in a web conferencing client, particularly that removes noise while preserving music-on-hold and beeps/tones, allowing the customer to clearly hear someone calling from a noisy environment, without confusing them by removing needed beeps, tones, or music. That is, the techniques herein are directed to enhancing the quality of the audio without losing audio queues common to telephony. More than simply receiver-side processing and also more than just tone detection, the techniques herein, in particular, maintain audio signal processing/enhancement techniques, which normally would silence the tones/music, but now allow the required tones/music to pass through based on an algorithm of audio detection and processing-state switching.

Specifically, the techniques herein provide a method for receive-side audio processing for calls in a web conferencing client that includes receiving, by a device, an audio signal from a sending device and detecting, by the device, a particular telephony audio cue present in the audio signal, wherein the particular telephony audio cue has similar characteristics of noise that is to be removed by a noise removal operation. The method further includes preserving, by the device, the particular telephony audio cue in the audio signal throughout the noise removal operation on the audio signal and causing, by the device, an enhanced audio signal to be produced in conjunction with the noise removal operation, wherein the enhanced audio signal includes the particular telephony audio cue to be delivered to a receiver device.

Illustratively, the techniques described herein may be performed by hardware, software, and/or firmware, such as in accordance with the audio enhancement process 248, which may include computer executable instructions executed by the processor(s) 220 to perform functions relating to the techniques described herein, e.g., in conjunction with other processes, such as conferencing processes, etc.

Operationally, the techniques herein run beep detection and bandwidth extension algorithms in parallel with music and tone detection. When M-O-H or beeps are detected, the system goes into a bypass mode that preserves the original audio. Beeps can be very short, as short as 200-msec. If the system takes too long to detect the beep, the system might enter bypass after the beep has already finished, removing the entire beep. Therefore, the beep detection must be very fast, e.g., within 50-msec. M-O-H tends to be much longer, typically seconds or longer. Therefore, the M-O-H detector favors accuracy at the expense of a couple of seconds of latency.

For tone detection, instead of detecting specific tones/beeps, a more general definition is used. A tone is defined as a set of one to five individual frequencies of constant amplitude with a duration of at least 200-msec. With the exception of the "You are Being Recorded" beep, tones will not overlap with other audio content. Tone detection latency is 50-msec ensuring at least 150-msec of the tone is preserved.

For music detection, "Music On Hold" is discriminated from background music. This may be accomplished with a trained neural network. The detection decision if filtered by the Signal-to-Noise (SNR) reported by the Noise Removal with the expectation that music is classified as noise to be removed.

In particular, the techniques herein may employ any number of machine learning (ML) and/or artificial intelligence (AI) techniques, such as to enhance audio based on one or more audio enhancement models, as described herein, such as to detect Music On Hold and to differentiate it from background music. In general, machine learning is concerned with the design and the development of techniques that receive empirical data as input (e.g., audio streams, herein), recognize complex patterns in the input data, and optionally make adjustments to the data (e.g., enhancing the data, filling in missing data, changing the data, etc.). For example, some machine learning techniques use an underlying model, which is trained to perform certain operations (e.g., classifying data, adjusting data, and so on). A learning process adjusts parameters of the model such that after this optimization/learning phase, the model can be applied to input data sets to perform the desired functionality.

In various embodiments, such techniques may employ one or more supervised, unsupervised, or semi-supervised machine learning models. Generally, supervised learning entails the use of a training set of data, as noted above, that is used to train the model to apply labels to the input data. On the other end of the spectrum are unsupervised techniques that do not require a training set of labels. Notably, while a supervised learning model may look for previously seen patterns that have been labeled as such, an unsupervised model may attempt to analyze the data without applying a label to it. Semi-supervised learning models take a middle ground approach that uses a greatly reduced set of labeled training data.

Example machine learning techniques that the techniques herein can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, deep neural networks (DNNs), or the like.

Real Time Generic Tone Detection

Tones are used in telephony to provide audio queues to the participants regarding the status of the call. These tones are composed of one to five discrete frequencies of constant amplitude and of a duration of not less than 200-msec. Each discrete frequency is defined to be withing a fixed percentage of the specified base frequency and will be in the range of 50 Hz to 4 kHz.

Audio processing common to telephony, particularly noise reduction, will suppress these tones. As mentioned, a method is required to detect and preserve these tones. One approach would be to identify and reproduce the tone following other processing. However, these tones are generated by automated systems and do not normally overlap with other audio content. Therefore, detection and bypassing other processing is an acceptable solution.

In particular, according to aspects of the techniques herein, as tones are composed of discrete frequencies, use of a discrete Fourier transform (DFT) is a natural starting point. A limiting factor is that a traditional DFT has uniform frequency resolution across the entire baseband. The Time/Frequency relationship, of a DFT means a high frequency resolution (large DFT) results in a low time resolution (i.e., detection latency). The solution is to utilize a Warped Discrete Fourier Transform (WDFT), which provides a non-uniform frequency resolution across the baseband. This allows an increase in resolution for lower frequency bins at the expense of resolution at higher frequency bins while keeping the time resolution reasonable.

Figure 6:
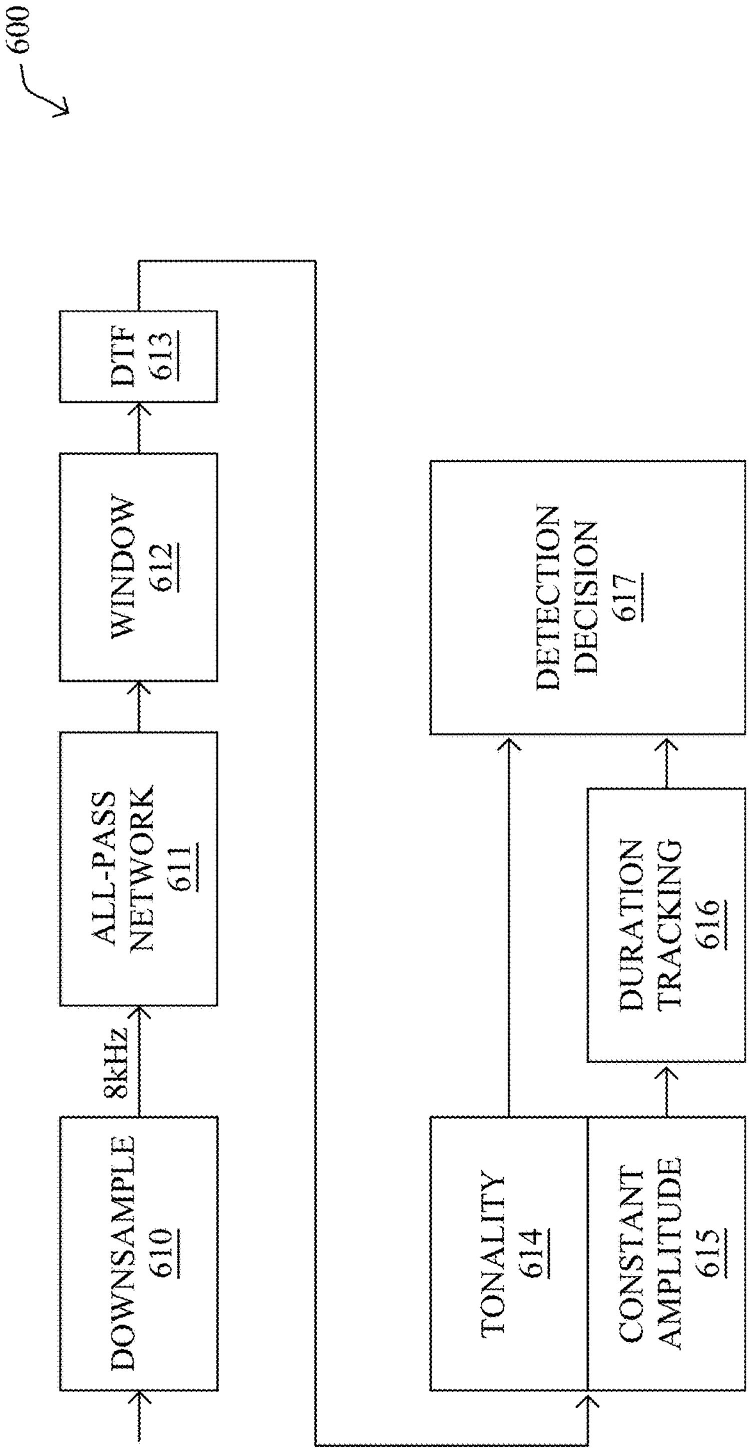
FIG. 6 illustrates an example Warped Discrete Fourier Transform (WDFT) for real time generic tone detection.
Figure 7:
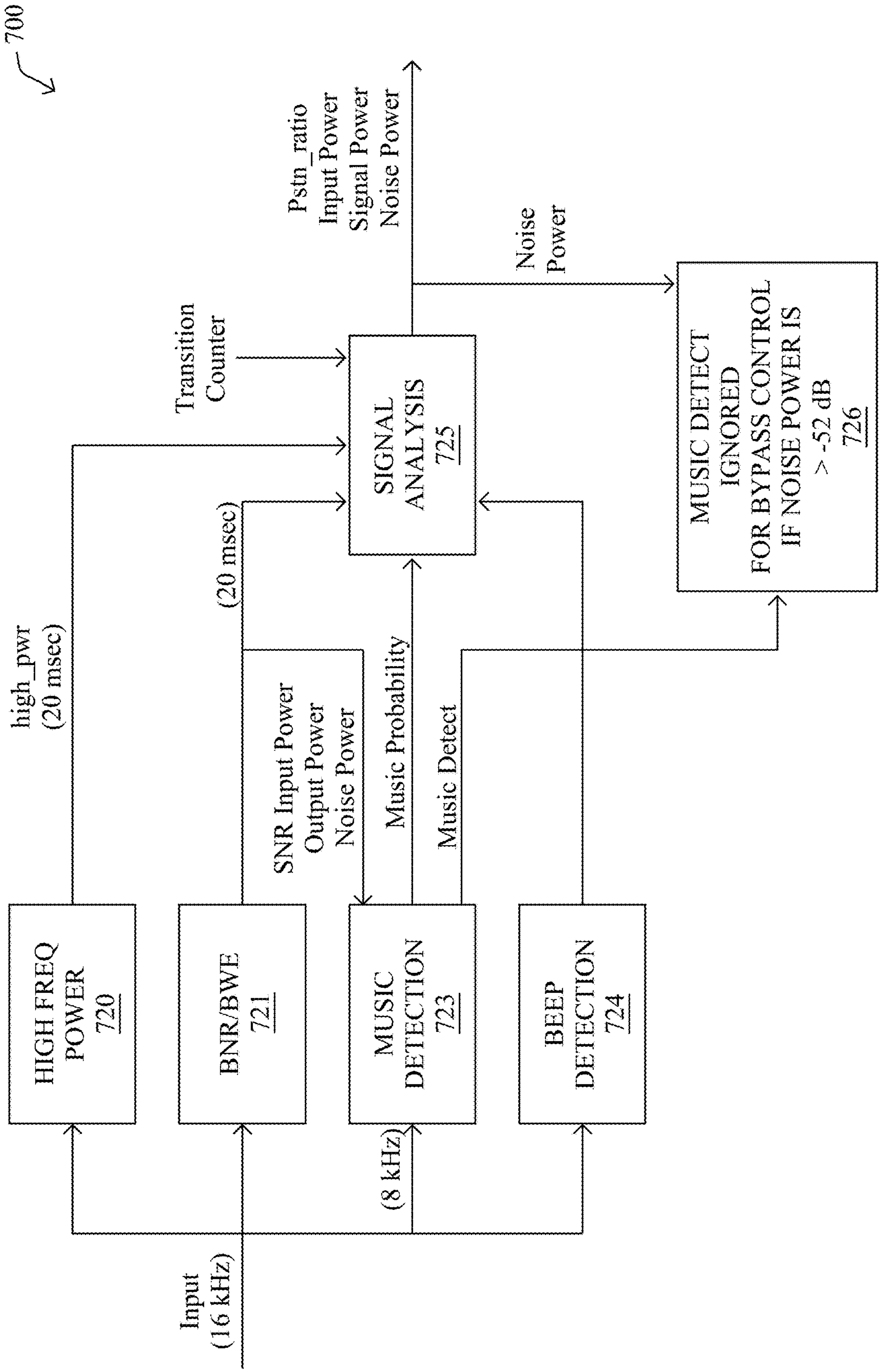
FIG. 7 illustrates an example diagram of a system for receive-side audio processing for calls in a web conferencing client.

FIG. 6 illustrates an example Warped Discrete Fourier transform (WDFT) for real time generic tone detection. With reference to logic 600 of FIG. 6, the warping is accomplished by preceding a short time Fourier transform (STFT) with an All-Pass filter. As shown in FIG. 6, the logic 600 can perform a downsample operation 610 on a received signal (e.g., a signal comprising a tone that includes multiple discrete frequencies that is received as indicated by the arrow entering the downsample operation 610 box from the left side of FIG. 6). As shown in FIG. 6, the downsample operation 610 is performed at 8 kHz to attenuate the input signal (e.g., to downsample or attenuate a 16 kHz signal down to 8 kHz, as shown in FIG. 7), although implementations are no limited to this particular value (e.g., downsampling can be performed at various frequency ranges, such as downsampling a 32 kHz signal to a 16 kHz signal, downsampling a 8 kHz signal to a 4 kHz signal, etc.). The downsampled signal can then be passed to an all-pass network 611. As will be appreciated, the all-pass network 611 can be a network that is the combination of the minimum and non-minimum phase systems and may have the unity magnitude for all frequencies. Further, the all-pass network 611 may only impart a 180-degree phase shift. In general, the all-pass network 611 may be used to provide phase equalization in a communication system.

In some embodiments, a window 612 may be applied to the signal(s) subsequent to traversal of the all-pass network 611. As will be appreciated, the window 612 can be a weighting function, tapering function, apodization function, or the like that represents one or more mathematical functions that are zero-valued outside a chosen interval. The window 612 may be applied to reduce the amplitude of discontinuities at the boundaries of finite sequences associated with the signal(s) to, for example, minimize the effect of leakage to better represent the frequency spectrum of the signal(s), particularly for subsequent processing (e.g., using Fourier Transform techniques).

Subsequent to application of the window 612, a Fourier transform may be applied to the resultant signal. As shown in FIG. 6, the Fourier transform is a discrete Fourier transform 613 (or "DFT"). As will be appreciated the, discrete Fourier transform 613 can be utilized to convert a finite sequence of equally-spaced samples of a function into a same-length sequence of equally-spaced samples of a discrete-time Fourier transform (DTFT). However, as described in more detail herein, utilization of the DFT may result in a low time resolution and, accordingly, embodiments herein contemplate the utilization of a Warped Discrete Fourier Transform (WDFT), which can provide a non-uniform frequency resolution across the baseband. As mentioned above, this may allow an increase in resolution for lower frequency bins at the expense of resolution at higher frequency bins while keeping the time resolution reasonable.

Regardless of the Fourier transform technique performed at the foregoing step, a tonality 614 for the signal(s) may be determined, as discussed below. In addition, each tone may exhibit a constant amplitude 615 for a minimum duration, as discussed below. Duration tracking 616 may be performed to understand the duration of these tones. Finally, as discussed in more detail below, a detection decision 617 is made when count exceeds a minimum threshold for a particular tone.

A non-limiting example in connection with the illustration of FIG. 6 follows. The signal of interest is a set of discrete frequencies of roughly the sample amplitudes with little or no overlapping signals. The first step is to compute a tonality for the STFT frame. Identifying the frequency bins with the highest power the number of frequency bins with powers with 40 dB of the maximum are counted. One minus the ratio of this count relative to the total number of frequency bins is the tonality of the signal. For a tone to be identified the threshold must exceed an experimentally defined threshold.

In addition to tonality, each tone should be of constant amplitude for a minimum duration. For each frequency bin within 20 dB of the maximum, the power is tracked relative to the previous SFFT frames. If the power is within 1 dB a counter is incremented, otherwise the counter is reset to zero. As the tone may drift between frequency bins, focus is placed in the bin around the frequency with the highest power. When this count exceeds a minimum threshold a tone detection is declared.

Experimentally, using an 8 kHz sample rate a 160 point fast Fourier transform (FFT) with an 80 sample overlap was selected for the SFFT. This equates to a 5-msec frame period. The Count threshold was selected as 50-msec with the 1st order all-pass warping filter adding an addition 20-msec latency. This solution provides a near 100% detection rate of clean tones with a latency of 70-msec relative to other system processing. For tones of 200-msec duration, 65% of the tone is preserved.

Accordingly, for systems that do not require identification of the detected tone this solution provides a high probability of preserving a sufficient portion of the audio queue to convey the associated information to the call participants.

Signal Analysis

FIG. 7 illustrates an example diagram of a system 700 for receive-side audio processing for calls in a web conferencing client. As shown in FIG. 7, the system 700 includes Similar to the illustration of FIG. 6, an input signal is received by the system 700. As shown in FIG. 7, the input signal(s) has or have a frequency of 16 kHz, although embodiments are not so limited. The input signal(s) are passed through the background noise reduction (BNR)/band-width extension (BWE) modules, e.g., the BNR/BWE processor 721, as discussed in more detail below. As shown in FIG. 7, the signal(s) can be passed through a high frequency power processing device 720, which can output a high power signal for a given period of time. A music detection processor 723 and/or a beep detection processor 724 can receive and/or process the signal(s), which may be attenuated or downsampled, as discussed above in connection with FIG. 6.

As sown in FIG. 7, the outputs from the high frequency power processing device 720, the BNR/BWE processor 721, the music detection processor 723, and/or the beep detection processor 724 can be sent to a signal analysis processor 725. The signal analysis processor 725 can be any type of signal analysis processor that may, in general, receive signal inputs that have been digitized and utilizes one or more mathematical algorithms to manipulate the input signal(s) to transform such signal(s). Non-limiting examples of transformation of such signal(s) can include the application of mathematical algorithms to "real-world" signals such as voice, audio, video, temperature, pressure, and/or position that can be manipulated to provide equalization, filtering, and/or dynamic adjustments to such signal(s) via the signal analysis processor 725.

A non-limiting example in connection with the illustration of FIG. 7 follows. Input signals are received and passed through high frequency power processing device 720 (outputting high power for the last 20-msec), background noise reduction (BNR)/band-width extension (BWE) modules (outputting SNR, input power, signal power, and noise power), music detection (taking the output from BNR/BWE processor 721 and outputting a music probability processed by the music detection processor 723), and beep detection (e.g., as processed by the beep detection processor 724) as described herein. Each of the outputs from these processes, processors, and/or modules are then passed for signal analysis processing (e.g., by the signal analysis processor 725) along with a transition counter (as described herein) to determine/relay a PSTN ratio, input power, signal power, and noise power, as described herein.

In some embodiments, the "music detect" processed by the music detection processor 723 may be ignored for bypass control if noise power is greater than-52 dB, as indicated in block 726.

In further detail, within a period of 20 milliseconds or "msec" (e.g., a "20-msec task"), the techniques herein are directed toward collecting the following statistics:

high input power, full input power;
output power;
noise power; and
snr.

During a 200-msec period (e.g., a "200-msec task"), the techniques herein perform the following actions:

For Collected statistics, compute Minimum, Maximum, and average for 200-msec slot.
Update PSTN ratio. High input power/Full input power.
Define initial state for the 200-msec slot.
  PSTN_AN_STATE_NO_NOISE (Average noise power<65 dB);
  PSTN_AN_STATE_NO_SPEECH (Average output power<65 dB);
  PSTN_AN_STATE_NOISE (Minimum SNR<20 dB); and
  PSTN_AN_STATE_SPEECH (Maximum SNR>0 dB).

Notably, for the first three seconds, the techniques herein may perform an abbreviated analysis although embodiments are not so limited and other time frames (e.g., one second, two seconds, four seconds, as well as partial seconds, such as 1.5 seconds, 2.5 seconds, 3.1 seconds, 3.4 seconds, etc.) are contemplated within the scope of the disclosure.

Within 1 second (e.g., a "1 sec task"), and based on maintaining a history illustratively for the previous 4.2 seconds (21 slots), the techniques herein:

Back track Music detections, Beep detections, and BNR/BWE transitions into past slots. Also, update Speech/Noise classifications.
Identify which slots to identify as Speech and/or noise. Also, identify slots to ignore in estimates.
Input power estimate updates from most recent slots.
Noise and signal power estimates updated from oldest second of data.
  Maintain 5 slot history for input, signal, and noise power estimates. (Minimum, maximum, and summation).
  Update signal and noise power level estimates.
  Special Conditions.
    Noise level is never greater than input level.
    Signal level is never less than input level.
    If input level indicates silence, immediately force noise level to minimum.

Figure 8:
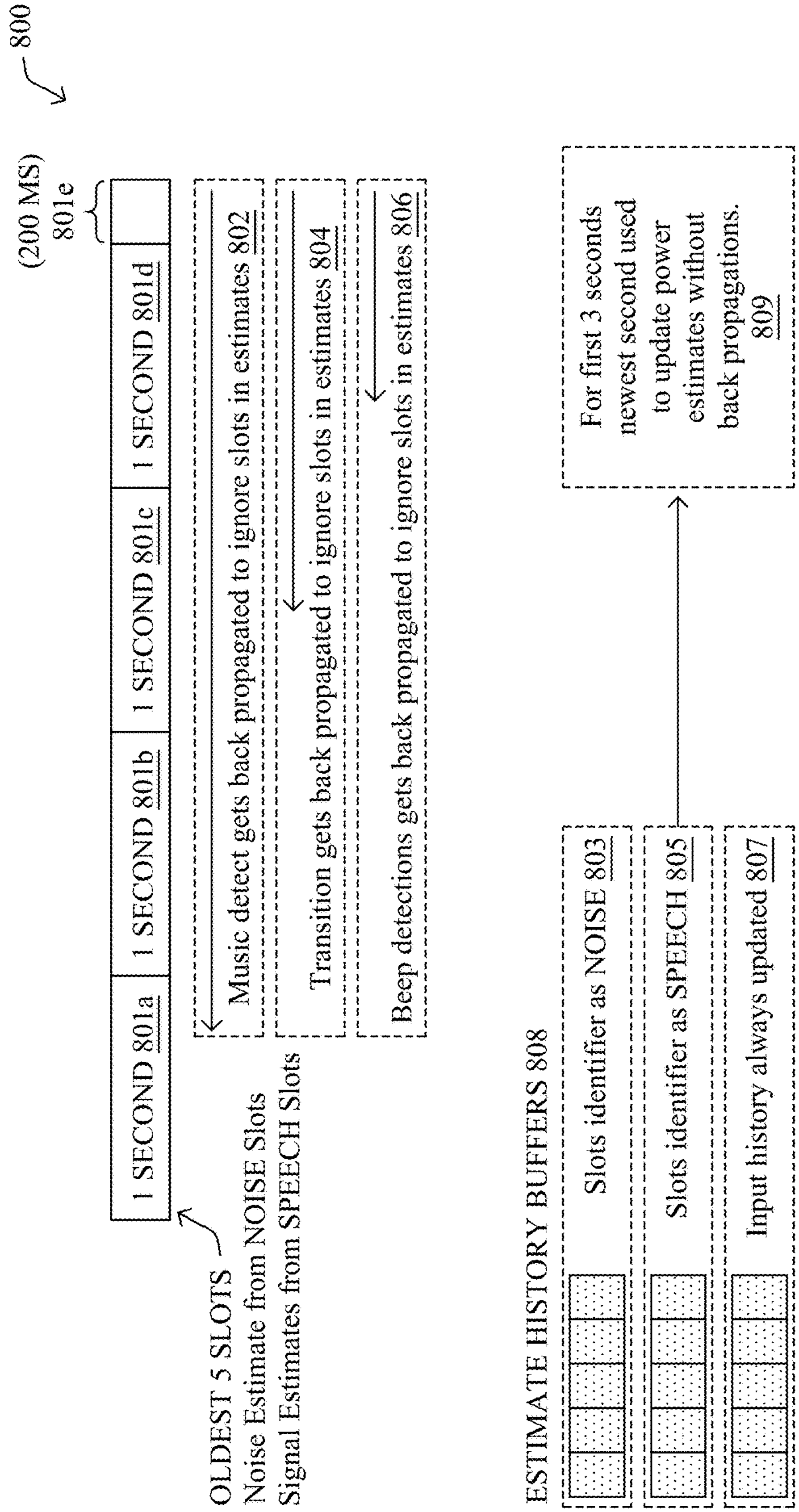
FIG. 8 is an example illustration 800 of a history buffer having a particular quantity of slots in accordance with one or more implementations described herein.

FIG. 8 is an example illustration 800 of a history buffer having a particular quantity of slots 801 (e.g., the slots 801*a*, 801*b*, 801*c*, 108*d*, and/or 801*e*, e.g., a "21-slot" history buffer) in accordance with one or more implementations described herein. The slots 801 may each have a temporality associated therewith. For example, in the non-limiting example of FIG. 8, each of the slots (e.g., 801*a*-801*d*) are associated with a quantity of slots that are utilized during a particular period of time (one second in the example of FIG. 8). That is, the slots 801*b* are associated with a different second than the slots 801*a*, the slots 801*c* are associated with a different second than the slots 801*b* and the slots 801*d* are associated with a different second than the slots 801*c*, while the slot 801*e* is associated to a newest or most contemporaneous space in time.

The non-limiting example of FIG. 8 focuses on music detection and/or beep detection; however, it will be appreciated that the techniques of the disclosure contemplate various sounds, noises, or the like that are applicable to the techniques described herein. As shown in FIG. 8, there may be a newest slot (slot 801*e*) and various "older" slots, such as the oldest five slots (slots 801*a*). One or more of the slots 801 can be dedicated to particular characteristics, such as noise estimates from NOISE slots, signal estimate from SPEECH slots, input history, etc. In addition, FIG. 8 illustrates estimate history buffers 808, which may be used to temporarily store (e.g., buffer) various data associated with the slots 801 described herein.

The example illustration 800 of FIG. 8 shows a newest slot, the oldest five slots, and a plurality of intervening slots that may be based on temporal characteristics that lie between a "newest" slot and an "oldest" slot. The oldest five slots (slots 801*a*) can include various information such as noise estimates from NOISE slots, signal estimates from SPEECH slots, input history, etc.). In the non-limiting example shown and as described herein, and particularly in FIG. 8, music detect gets back propagated to ignore slots in estimates, as shown at block 802; transitions get back propagated to ignore slots in estimates, as shown at block 804; and beep detections get back propagated to ignore slots in estimates, as shown at block 806.

Returning to the estimate history buffers 808, as illustrated in FIG. 8, these buffers can store slots identified as NOISE 803, slots identified as SPEECH 805, and/or can include slots reserved for input history 807, which can be continuously (e.g., "always") updated, or may be updated periodically, and/or in response to a user command or other input.

Also, as shown at block 809, for the first 3 seconds (or any other temporal period), the newest second (e.g., the slot 801*b* associated with a different second than the slots 801*a*, the slots 801*c* associated with a different second than the slots 801*b*, or the slots 801*d* associated with a different second than the slots 801*c*) may be used to update power estimates without back propagations. As also shown, estimate history buffers may be broken down into slots identifiers as NOISE or SPEECH, and input history should always be updated, as described above in connection with the NOISE 803, the SPEECH 805, and the input history 807.

Figure 9:
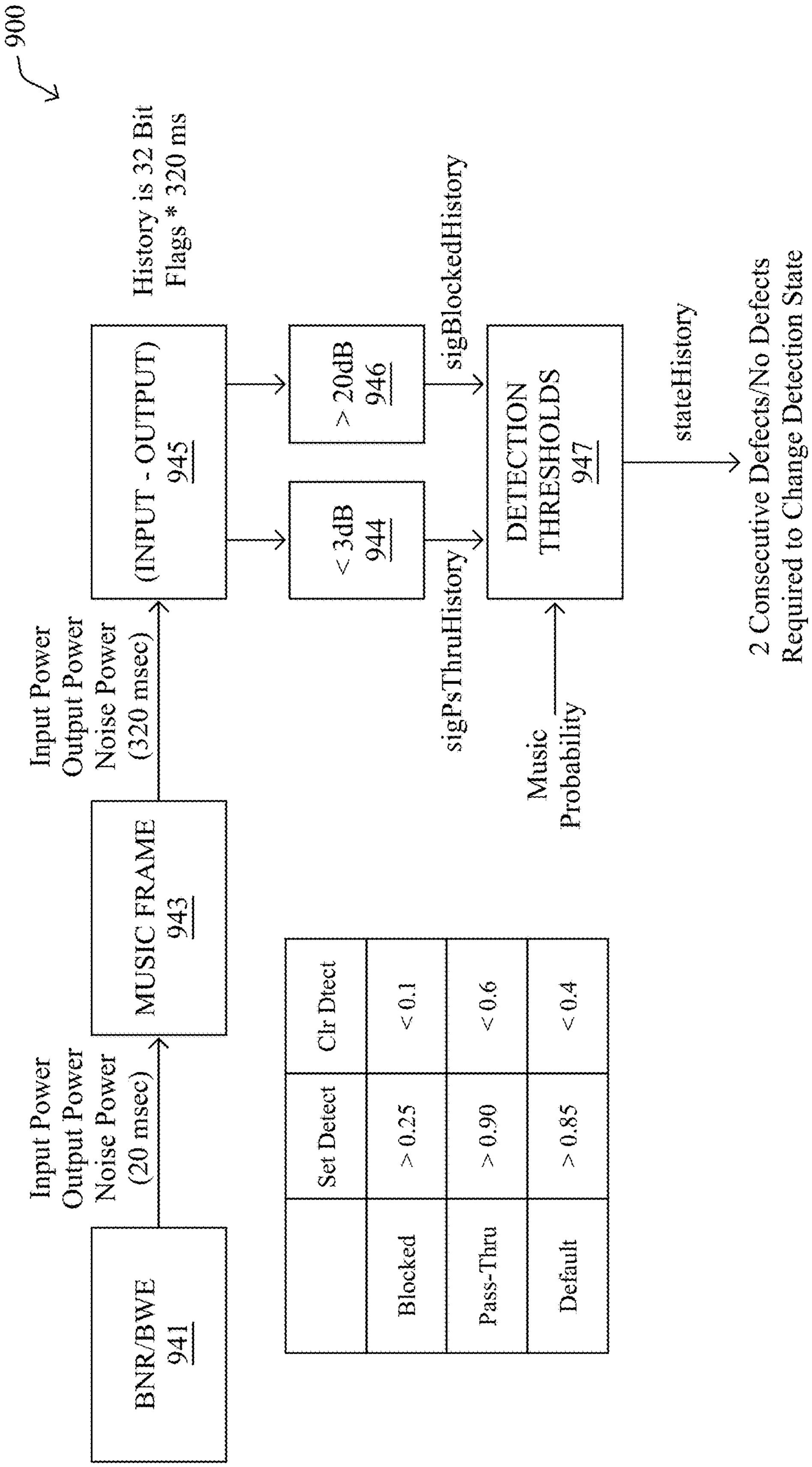
FIG. 9 is an example illustration of music detection in accordance with one or more implementations described herein.

FIG. 9 is an example illustration 900 of music detection in accordance with one or more implementations described herein. In particular, the output of input/output/noise powers from BNR/BWE 941, which can be analogous to the BNR/BWE processor 721 of FIG. 7, from the last 20-msec moves into a music frame 943, which processes 320-msec of signal information in order to pass into the differencing module 945 (input-output) to produce less than 3 dB (SigPsThruHistory) at block 944 and greater than 20 dB (SigBlockedHistory) at block 946 outputs for the detection thresholds 947. Based also on input from music probability noted above, the thresholds are applied to detect music, and stateHistory may be output such that two consecutive detects/no detects are required to change detection state.

Speaker Path Processing

Figure 10:
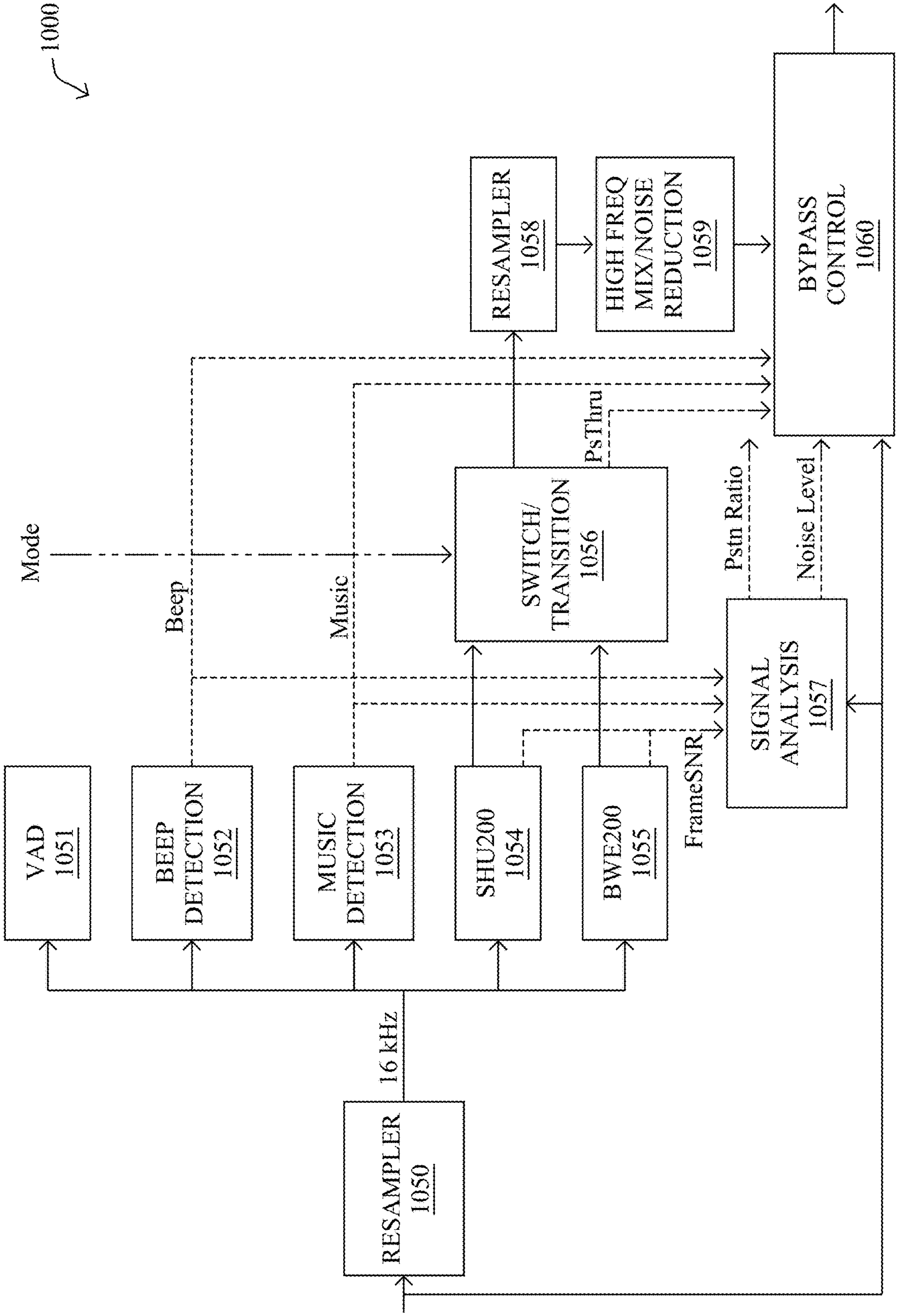
FIG. 10 illustrates another example system for receive-side audio processing for calls in a web conferencing client in accordance with one or more implementations described herein.

FIG. 10 illustrates another example system 1000 in accordance with one or more implementations described herein. As shown, a resampler 1050 outputs a 16 kHz signal into Voice Activity Detection 1051 (VAD), beep detection 1052, music detection 1053, a first signal processing unit 1054 (e.g., a SHU200 signal processing unit) and a duplexing module 1055 (e.g., a BWE200 duplexing module). Outputs are processed by a signal analysis module 1057 and switch/transition module 1056 (with mode input) as shown, to provide the signal ultimately to another resampler 1058 to pass on to high frequency mix/noise reduction module 1059, and then a bypass control unit 1060. In addition, the signal analysis module 1057 analyzes characteristics of the original signal (e.g., an unprocessed signal), which is also passed to the bypass control unit 1060.

Figure 11:
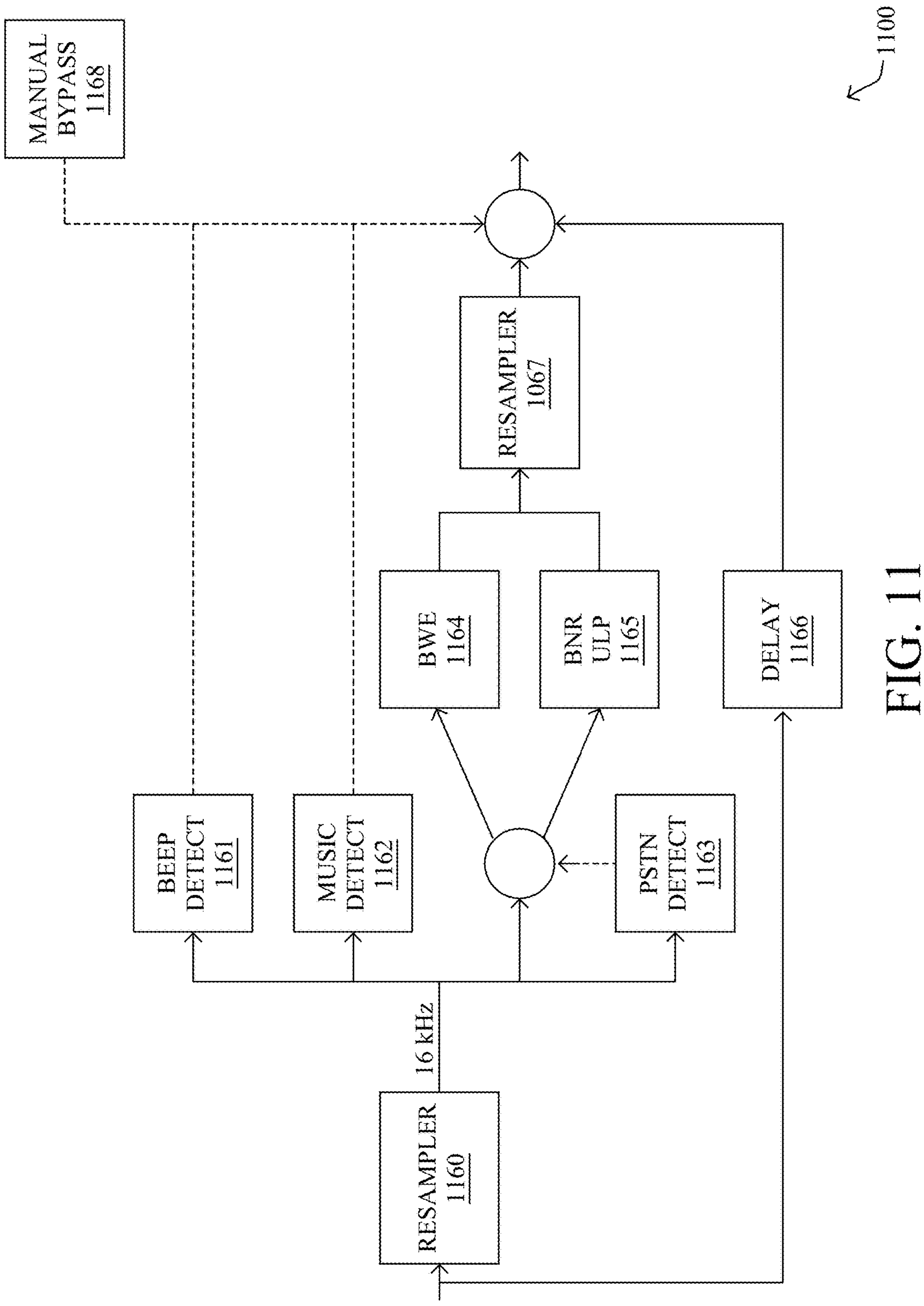
FIG. 11 is an example system for receive path processing in accordance with one or more implementations described herein.

FIG. 11 is an example system 1100 for receive path processing in accordance with one or more implementations described herein. Here, a resampler 1160 outputs a 16 kHz signal to beep detect module 1161, music detect module 1162, and PSTN detect module 1163 which controls whether the signal also passes to a BWE module 1164 or a BNR ULP module 1165 (ultra-low pass) before passing to another resampler 1167. All of the processed signals, including a manual bypass input and an optional delay input 1166, may then be passed through the receive path, accordingly. In addition, a manual bypass unit 1168 is provided to the system 1100.

According to the techniques herein, an illustrative Beep Detection Algorithm herein may comprise the following:

- 16 kHz input is down-sampled to 8 kHz with a bandpass filter set at 200 Hz to 3 kHz.
- Spectral Analysis is performed with a 20-msec frame and a 5-msec stride using a warped FFT instead of a uniform FFT. This warping increases the frequency resolution of the FFT for lower frequencies. A 160-point FFT is used.
- The frequency bin (max_pwr_idx) with the highest power (max_peak) is identified. If this is less than-80 dB, no beep is detected.
  - Note: This is the only absolute threshold in the algorithm. Raising it would reduce false detections on leading and trailing edges of utterances. However, levels vary from system to system so selecting a higher threshold could be problematic.
- Three thresholds are computed relative to max_peak. These make the algorithm operation independent of signal level.
- −10 dB (peak_m10), −20 dB (peak_m20), and −40 dB (peak_m40).
- Compute the spectral distribution of the frame. Count the number of bins with power that exceeds the −40 dB threshold (peak_m40). Consecutive bins with power between peak_m10 and—peak_m40 are given progressively greater weighting. This count is adjusted to a 0 to 1.0 probability (tone_prob) that the frame is highly tonal.
- Track number of frames (notSinceCount) since the last frame with low tonality. Low tonality is defined as a frame with at least 64 frequency bins with powers above peak_m40. This reduces false beep detections on the falling edge of speech utterances.
- Track constant frequency conditions. For each frequency bin, a counter is maintained (binCount[bin]) to track the number of frames in which the bin's power is above peak_m20 and has not changed by more than 1 dB from the previous frame.
- Track the frequency bin (current_bin_idx) with the longest constant power (current_bin_count) near the frequency bin (max_pwr_idx) with the highest power. This is to account for slight shifts in frequency from frame to frame due to the framing.
- Tonal probability below 60% is identified as not a beep. The constant frequency counters (binCount[bin]) and the time since low tonality (notSinceCount) are reset. Otherwise, the peaks in the spectrograph are identified. The peaks above the −20 dB threshold and the −10 dB threshold are counter (num_peak_20 && num_peaks_10). If there are no peaks above the −20 dB threshold below 300 Hz and if the total number of peaks above the −20 dB threshold is less than 10 the frame is marked as a possible beep (bIstonal=true). A counter is maintained to track the number of consecutive frames (tonalCount) marked as a possible beep.

According to the techniques herein, a process for entering a Beep state (start of beep) may be as follows:

Special tracking for 1.4 kHz tones. Increment a counter (track_1_4k_count) if max_pwr_idx is between bin 40 and 42.

Detect 1.4 Khz beep. (num_peaks_10<2) && (current_bin_count>=10) && (current_bin_count<=15) && (track_1_4k_count>=9).

If the 1.4 Khz tone persists for 50-msec and no other frequencies are within 10 dB, call it a beep.

Detect long duration stand-alone tone, (tonalCount>=9) && (current_bin_count>20).

If frequency persists for 200-msec, call it a tone.

Detect short duration stand along tone, (tonalCount>=9) && (current_bin_count>5) && (notSinceCount<17)

If frequency persists for 50-msec and is within 150-msec of silence, call it a tone.

Save frequency bin for detected tone: (tonalIndex=current_bin_idx)

According to the techniques herein, a process for leaving a Beep state (end of beep) may be as follows:

The end of the tone is identified when tonalIndex no longer equals current_bin_idx.

If the signal power is near the silence noise floor will exhibit tonal features. This leads to false detections at the leading and trailing edge of speech utterances. Also, if the 1.4 kHz beep overlaps speech it must be 10 dB above the speech signal to be detected.

Figure 12:
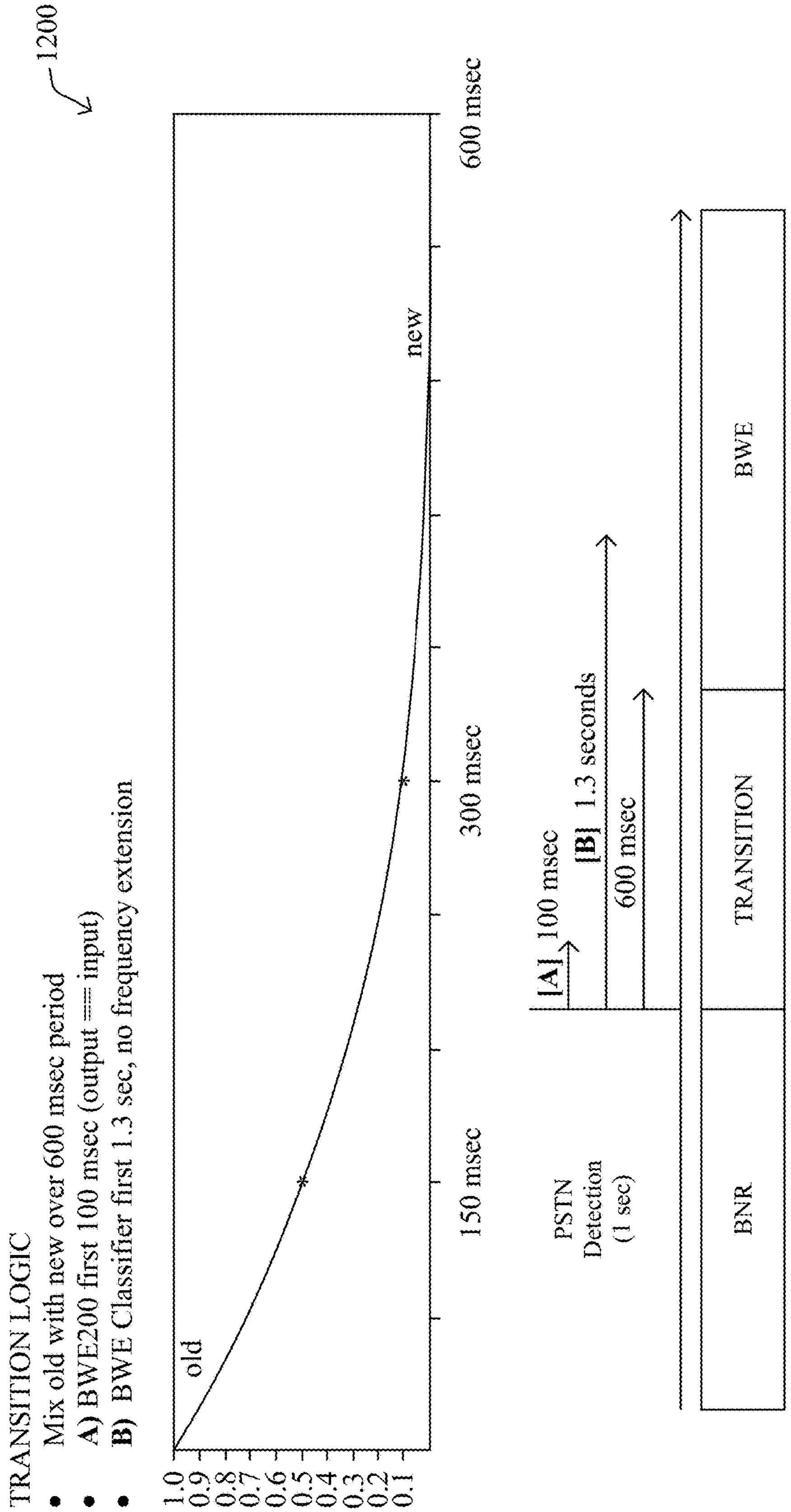
FIG. 12 illustrates an example of transition logic in accordance with one or more implementations described herein.

FIG. 12 illustrates an example of transition logic 1200 in accordance with one or more implementations described herein. In particular, the example transition logic mixes old with new over 600-msec transition period from BNR to BWE, where:

A) BWE200 first 100-msec (output==input); and

B) BWE Classifier first 1.3 sec, no frequency extension.

Music detection herein may be as follows:

Resample to 8 kHz.

FFT frame 40-msec, 20-msec stride.

Network input magnitude of last 16 frames (320-msec).

Network processing period (160-msec).

Network startup period (1.44 sec). No Detection.

If noise level is greater than −50 dB, Music detection does not cause bypass.

FIG. 13 is an illustration 1300 of a Macro Analysis of SNR in accordance with one or more implementations described herein. As shown, the techniques herein may measure SNR metrics for 20 ms frame. (BWE statistics low-passed at 4 kHz). For instance:

Signal power—input to BNR;

Signal hp power—input high-passed at 4.5 kHz;

Output power—output of BNR;

Noise power—signal removed by BNR; and

SNR—(signal power/noise power).

In addition, for a 200-msec period analysis:

State—BNR in transition, Beep Detection, Music Detection;

SNR metrics—(Maximum, Average, and Minimum Values);

spchFrameCount—Number of frames SNR is greater than OdB (PSTN Detection); and hfFrameCount—Number of frames Signal hp power is greater than-64 dB (PSTN Detection).

Also, 3.2 seconds of history may be collected (Music Detection has about 3 seconds of latency so there is a need to backtrack detections).

SNR Analysis for the 200-msec slot first comprises collecting statistics for metrics, such as the maximum, average, and minimum. Then state can be updated as follows:

BNR transition, beep detection, and music detection;

If average noise power is less than −65 dB, indicate NO_NOISE;

If average output power is less than −65 dB, indicate NO_SPEECH;

If minimum SNR is less than −20 dB indicate NOISE;

If maximum SNR is greater than 0 dB indicate SPEECH; and

Detect SILENCE as NO_NOISE and NO_SPEECH.

In addition, SNR Analysis for a 1 second update may be based on a Slot History of 3.2 seconds that is maintained by the system (16 slots). Slot state may then be updated newest to oldest:

Music detections are back propagated for 3 seconds.

Beep detections are back propagated for 400-msec.

BNR transitions are back propagated for 200-msec.

Slot State is updated to indicate SPEECH and/or NOISE.

Noise measurements are excluded in back propagation.

Moreover, the techniques herein analyze the oldest second of the slots to update levels:

Input level is average of slot's maximum signal statistic.

Signal level is average of slot's maximum signal statistic for slots marked as SPEECH.

Noise level is average of slots' minimum noise statistic for slots marked as NOISE.

According further to the techniques herein with regard to PSTN Detection (internal), for each 200-msec slot, the PSTN ratio may be updated, where the PSTN ratio is the average signal high frequency power over full-band power. Note that the PSTN ratio may not be updated if a beep was detected, the full-band signal average power is less than −50 dB, or spchFrameCount is less than 5 (100-msec) and minimum high frequency signal power is less than −64 dB. Note also that SpeechActivityCount may be updated using spchFrameCount indicating frames where speech was detected.

Illustrative System Logic according to the techniques herein may then be described as follows:

Start in Bypass mode. Ensure music preceding speech is audible.

While SpeechActivityCount is less than 140-msec:

If noise level exceeds −50 dB switch to BNR mode.

When SpeechActivityCount exceeds 140-msec:

Switch to BWE if pstn ratio is less than −35 dB, otherwise switch to BNR.

After switch to BWE:

If pstn ratio exceeds −29 dB, switch back to BNR.

Figure 14:
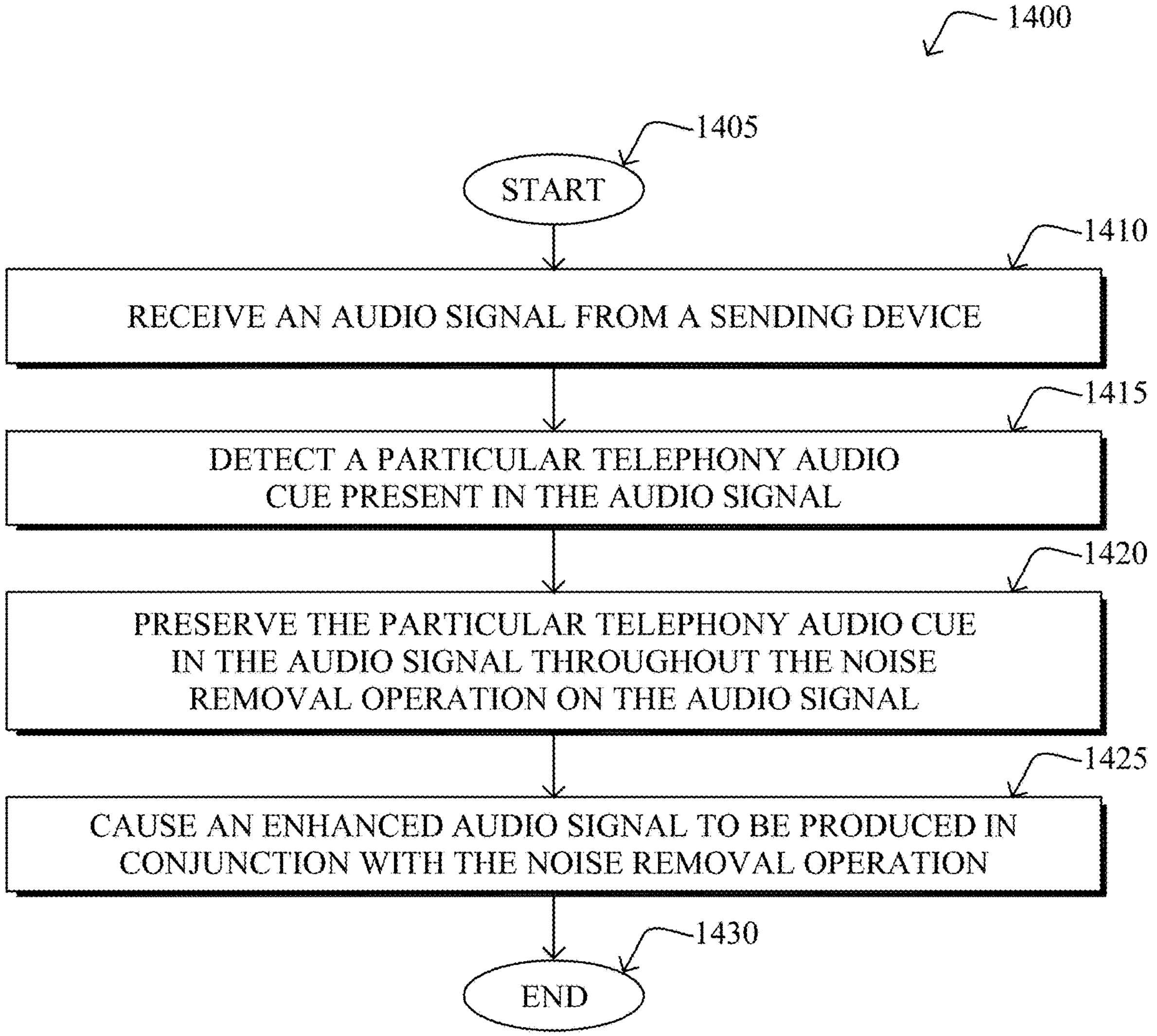
FIG. 14 illustrates an example simplified procedure for receive-side audio processing for calls in a web conferencing client in accordance with one or more implementations described herein.

FIG. 14 illustrates an example simplified procedure for receive-side audio processing for calls in a web conferencing client in accordance with one or more implementations described herein. For example, a non-generic, specifically configured device (e.g., device 200) may perform procedure 1400 by executing stored instructions (e.g., the audio enhancement process 248). The procedure 1400 may start at step 1405, and continues to step 1410, where, as described in greater detail above, a device receives an audio signal from a sending device.

The procedure 1400 continues to step 1415 where, as described in greater detail above, the device detects a particular telephony audio cue present in the audio signal, wherein the particular telephony audio cue has similar characteristics of noise that is to be removed by a noise removal operation. In some implementations, detecting the particular telephony audio cue present in the audio signal can include differentiating the particular telephony audio cue from noise based on identifying frequency bins within the audio signal that have power levels exceeding a predefined threshold.

The procedure 1400 continues to step 1420 where, as described in greater detail above, the device preserves the particular telephony audio cue in the audio signal throughout the noise removal operation on the audio signal. The procedure 1400 can further include determining whether the audio signal is a narrow band signal and extending bandwidth of the audio signal to full band for narrow band signals, although implementations are not so limited.

The procedure 1400 continues to step 1425 where, as described in greater detail above, the device causes an enhanced audio signal to be produced in conjunction with the noise removal operation, wherein the enhanced audio signal includes the particular telephony audio cue to be delivered to a receiver device. In some implementations, the noise removal operation on the audio signal is a receiver-side audio processing operation for a call within a web conferencing client, although implementations are not so limited.

As discussed above, the procedure 1400 can include applying a warped discrete Fourier transform to the audio signal to enhance frequency resolution for lower frequency bins. In some implementation, applying the warped discrete Fourier transform is preceded by applying an all-pass filter to the audio signal to adjust a phase response of the audio signal prior to detecting the particular telephony audio cue. The particular telephony audio cue can be a tone indicating a status of a communication associated with the audio signal, although implementations are not so limited. For example, the particular telephony audio cue can be at least one selected from a group of music on hold, answering service tones, touch tones, and combinations thereof.

The procedure 1400 can further include utilizing a machine learning model trained to differentiate between music-on-hold and background music. Further, in some implementations, the procedure 1400 can include training a machine learning model to detect the particular telephony audio cue.

In some implementations, the procedure 1400 can include tracking a power level of each frequency bin in the audio signal over consecutive short-time Fourier transform (STFT) frames to identify constant amplitude signals indicative of telephony audio cues.

The procedure may then end at step 1430.

It should be noted that while certain steps within procedure 1400 may be optional as described above, the steps shown in FIG. 14 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

In some implementations, an apparatus comprising one or more network interfaces to communicate with a network, a processor coupled to the one or more network interfaces and configured to execute one or more processes, and a memory configured to store a process that is executable by the processor. In such implementations, the process, when executed, may be configured to receive an audio signal from a sending device; detect a particular telephony audio cue present in the audio signal, wherein the particular telephony audio cue has similar characteristics as noise that is to be removed by a noise removal operation; preserve the particular telephony audio cue in the audio signal throughout the noise removal operation on the audio signal; and cause an enhanced audio signal to be produced in conjunction with the noise removal operation, wherein the enhanced audio signal includes the particular telephony audio cue to be delivered to a receiver device.

In still other implementations, a tangible, non-transitory, computer-readable medium can have computer-executable instructions stored thereon that, when executed by a processor on a computer, cause the computer to perform a method comprising receiving, by a device, an audio signal from a sending device; detecting, by the device, a particular telephony audio cue present in the audio signal, wherein the particular telephony audio cue has similar characteristics of noise that is to be removed by a noise removal operation; preserving, by the device, the particular telephony audio cue in the audio signal throughout the noise removal operation on the audio signal; and causing, by the device, an enhanced audio signal to be produced in conjunction with the noise removal operation, wherein the enhanced audio signal includes the particular telephony audio cue to be delivered to a receiver device.

Closing

The techniques described herein, therefore, provide for receive-side audio processing for calls in a web conferencing client, particularly to enhancing the quality of the audio without losing audio queues common to telephony. Though there are multiple examples today of the individual components of noise removal, band-width extension, tone detection, and music detection, no other system enhances speech while preserving beeps and music-on-hold according to the techniques herein.

Illustratively, the techniques described herein may be performed by hardware, software, and/or firmware, (e.g., an "apparatus") such as in accordance with the audio enhancement process 248, e.g., a "method"), which may include computer-executable instructions executed by the processor(s) 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the process (e.g., the audio enhancement process 248).

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as such as for videoconferencing services, other suitable technologies, protocols, and associated devices may be used in accordance with the techniques described above, such as one-on-one video communication protocols (e.g., video calls). In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

It should be noted that while certain steps within procedures above may be optional as described above, the steps shown and described are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures are described separately, certain steps from each procedure may be incorporated into each other procedure, and the procedures are not meant to be mutually exclusive.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:

receiving, by a device, an audio signal from a sending device;

detecting, by the device, a particular telephony audio cue present in the audio signal, wherein the particular telephony audio cue has similar characteristics of noise that is to be removed by a noise removal operation;

preserving, by the device, the particular telephony audio cue in the audio signal throughout the noise removal operation on the audio signal by automatically bypassing, responsive to detecting the particular telephony audio cue, the noise removal operation during one or more time intervals of the audio signal that correspond to the detected particular telephony audio cue, while continuing to apply the noise removal operation during other time intervals of the audio signal that do not contain the particular telephony audio cue; and causing, by the device, an enhanced audio signal to be produced in conjunction with the noise removal operation, wherein the enhanced audio signal includes the particular telephony audio cue to be delivered to a receiver device.

2. The method as in claim 1, further comprising:

applying a warped discrete Fourier transform to the audio signal to enhance frequency resolution for lower frequency bins.

3. The method as in claim 2, wherein applying the warped discrete Fourier transform is preceded by applying an all-pass filter to the audio signal to adjust a phase response of the audio signal prior to detecting the particular telephony audio cue.

4. The method as in claim 1, wherein detecting comprises:

differentiating the particular telephony audio cue from noise based on identifying frequency bins within the audio signal that have power levels exceeding a predefined threshold.

5. The method as in claim 1, further comprising:

utilizing a machine learning model trained to differentiate between music-on-hold and background music.

6. The method as in claim 1, wherein detecting comprises:

training a machine learning model to detect the particular telephony audio cue.

7. The method as in claim 1, further comprising:

determining whether the audio signal is a narrow band signal; and extending bandwidth of the audio signal to full band for narrow band signals.

8. The method as in claim 1, further comprising:

tracking a power level of each frequency bin in the audio signal over consecutive short-time Fourier transform (STFT) frames to identify constant amplitude signals indicative of telephony audio cues.

9. The method as in claim 1, wherein the particular telephony audio cue is a tone indicating a status of a communication associated with the audio signal.

10. The method as in claim 1, wherein the noise removal operation on the audio signal is a receiver-side audio processing operation for a call within a web conferencing client.

11. The method as in claim 1, wherein the particular telephony audio cue is at least one selected from a group of music on hold, answering service tones, touch tones, and combinations thereof, and wherein the device determines the one or more time intervals by segmenting the audio signal into analysis frames and identifying the one or more time intervals as one or more contagious analysis frames in which the particular telephony audio cue is detected.

12. An apparatus, comprising:

one or more network interfaces;

a processor coupled to the one or more network interfaces and configured to execute one or more processes; and a memory configured to store a process that is executable by the processor, the process when executed configured to:

receive an audio signal from a sending device;

detect a particular telephony audio cue present in the audio signal, wherein the particular telephony audio cue has similar characteristics of noise that is to be removed by a noise removal operation;

preserve the particular telephony audio cue in the audio signal throughout the noise removal operation on the audio signal by automatically bypassing, responsive to detecting the particular telephony audio cue, the noise removal operation during one or more time intervals of the audio signal that correspond to the detected particular telephony audio cue, while continuing to apply the noise removal operation during other time intervals of the audio signal that do not contain the particular telephony audio cue; and cause an enhanced audio signal to be produced in conjunction with the noise removal operation, wherein the enhanced audio signal includes the particular telephony audio cue to be delivered to a receiver device.

13. The apparatus as in claim 12, wherein the process when executed is further configured to:

apply a warped discrete Fourier transform to the audio signal to enhance frequency resolution for lower frequency bins.

14. The apparatus as in claim 13, wherein the process when executed is further configured to:

apply an all-pass filter to the audio signal to adjust a phase response of the audio signal prior to detecting the particular telephony audio cue before application of the warped discrete Fourier transform.

15. The apparatus as in claim 12, wherein to detect the particular telephony audio cue further comprises to:

differentiate the particular telephony audio cue from noise based on identifying frequency bins within the audio signal that have power levels exceeding a predefined threshold.

16. The apparatus as in claim 12, wherein the process when executed is further configured to:

train a machine learning model to detect the particular telephony audio cue.

17. The apparatus as in claim 12, wherein to detect the particular telephony audio cue further comprises to:

utilize a machine learning model trained to differentiate between music-on-hold and background music.

18. The apparatus as in claim 12, wherein the process when executed is further configured to:

determine whether the audio signal is a narrow band signal; and extend bandwidth of the audio signal to full band for narrow band signals.

19. The apparatus as in claim 12, wherein the process when executed is further configured to:

track a power level of each frequency bin in the audio signal over consecutive short-time Fourier transform (STFT) frames to identify constant amplitude signals indicative of telephony audio cues.

20. A tangible, non-transitory, computer-readable medium storing program instructions that cause a device to execute a process comprising:

receiving an audio signal from a sending device;

detecting a particular telephony audio cue present in the audio signal, wherein the particular telephony audio cue has similar characteristics of noise that is to be removed by a noise removal operation;

preserving the particular telephony audio cue in the audio signal throughout the noise removal operation on the audio signal by automatically bypassing, responsive to detecting the particular telephony audio cue, the noise removal operation during one or more time intervals of the audio signal that correspond to the detected particular telephony audio cue, while continuing to apply the noise removal operation during other time intervals of the audio signal that do not contain the particular telephony audio cue; and causing an enhanced audio signal to be produced in conjunction with the noise removal operation, wherein the enhanced audio signal includes the particular telephony audio cue to be delivered to a receiver device.

* * * * *